March 9, 1971 — A. L. MORETTI — 3,568,269
HOISTING HOOK GATE LATCH
Filed Aug. 21, 1969 — 2 Sheets-Sheet 1

INVENTOR
ANTHONY L. MORETTI
BY: Townsend and Townsend
ATTORNEYS

March 9, 1971  A. L. MORETTI  3,568,269
HOISTING HOOK GATE LATCH

Filed Aug. 21, 1969  2 Sheets-Sheet 2

INVENTOR
ANTHONY L. MORETTI
BY: Townsend and Townsend
ATTORNEYS

United States Patent Office 3,568,269
Patented Mar. 9, 1971

3,568,269
HOISTING HOOK GATE LATCH
Anthony L. Moretti, San Rafael, Calif., assignor to
E. D. Bullard Company, Sausalito, Calif.
Filed Aug. 21, 1969, Ser. No. 851,782
Int. Cl. B66c 1/34
U.S. Cl. 24—241                                    4 Claims

ABSTRACT OF THE DISCLOSURE

A lock for retaining a safety gate across the throat opening of a hoisting hook to prevent inadvertent disengagement of a load. The elements of the gate lock are formed by boring operations. The operative parts move radially of the axis of movement of the hook gate so that forces applied to unlock the gate do not tend to open the gate. A gate lock that can be expeditiously manipulated by a hot stick of the type used by power linemen.

---

This invention relates to a safety gate for a hoisting hook and, more particularly, to a latch or lock for releasably retaining the safety gate in a closed position across the throat of the hook so as to prevent inadvertent disengagement of the hook from a load.

The environment in which the present invention is employed includes a hoisting hook that has a cylindric shank extending therefrom and a suitable bail or the like fastened to the shank for effecting attachment of the hook to a hoisting line. Mounted on the cylindric shank between the bail and the hook body is a gate that is bored to fit on the cylindric shank to pivot between a position at which the gate spans and closes the throat of the hook and a position at which the gate is clear of the throat of the hook to permit engagement with or disengagement from a load. Prior art structures for releasably locking a safety gate in a throat spanning position are exemplified in such U.S. Patents as 2,728,967; 3,003,214; and 3,121,274.

The principal object of the present invention is to provide a gate lock that affords secure retention of the gate in a closed position and that can be fabricated solely by drilling or boring operations on the gate. Achievement of this object renders production of the hook less expensive and faster, as a consequence of which the gates can be provided at a far lower cost than heretofore possible.

Another object of the present invention is to provide a gate lock that can be hand operated or can be operated or manipulated by employment of a hot stick of the type used by linemen in the presence of high voltage power lines. Attainment of this object is possible because the part on which force is applied to release the lock extends radially of the hook shank so that the force employed to release the lock is normal to the force required to open the gate after the lock is released. Thus, manipulation of the lock and the gate with a hot stick is possible.

Other objects, features and advantages of the present invention will be more apparent after referring to the following specification and accompanying drawings in which.

Figures 1, 2, 3:
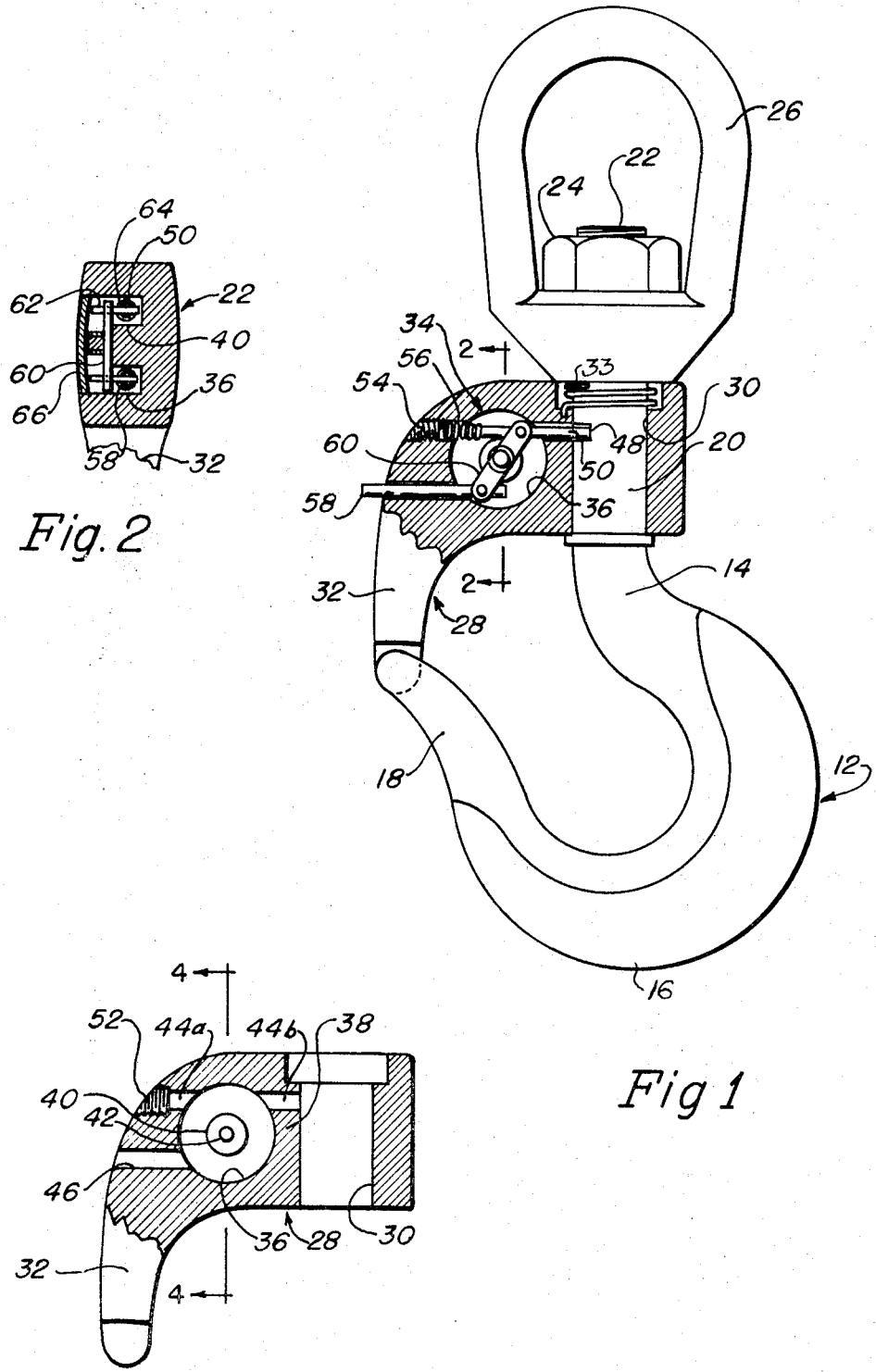
FIG. 1 is an elevation view of a hoisting hook and safety gate employing the lock of the present invention with portions being broken away to reveal internal details.
FIG. 2 is a cross-section view taken along line 2—2 of FIG. 1.
FIG. 3 is an elevation view of a hook gate adapted for use in the present invention and without the moving parts therein.

Referring more particularly to the drawing, reference numeral 12 indicates a hoisting hook of conventional form which includes a heel portion 14, a curved load supporting basket portion 16 and a tip 18. The space between heel 14 and tip 18 is known as the throat opening of the hook and permits entry of a load such as a sling or shackle into the hook for engagement in the basket portion of the hook. Extending upwardly from the main body of the hook adjacent heel 14 is a cylindric shank 20; the outer end of shank 20 is threaded at 22 to receive thereon a nut 24 for retaining a bail or eye 26 onto the hook. A hoisting cable or the like (not shown) is engaged with bail 26 when the hook is used for the intended purpose.

A gate 28 is formed with a cylindric bore 30 for engagement onto shank 20 between heel 14 and nut 24. Extending outwardly and downwardly from the portion of gate 28 in which bore 30 is formed is a throat spanning arm 32 which when in the position shown in FIG. 1 closes the throat thereby to prevent inadvertent disengagement of a load from hook basket portion 16. The gate is pivotable around shank 20, however, so that the gate can be pivoted aside when it is desired to engage or disengage the load. Gate 28 is counterbored concentrically with bore 30 to house a spiral spring 33 that biases the gate to a closed or throat-spanning position. A lock structure designated generally at 34 is provided according to the present invention for retaining gate arm 32 in a throat spanning position until the gate is intentionally opened.

The principal operative parts of lock 34 are contained in a cylindric chamber 36 that is bored in the body of gate 28 on an axis that extends generally tangentially of bore 30. As can be seen in FIG. 3, cylindric chamber 36 is spaced from bore 30 by a first gate portion 38. In forming chamber 36, a cylindric center post 40 is formed and is located concentric with the chamber; a fulcrum point 42, also concentric with cylindric chamber 36, is formed on the top of the post 40. It will be appreciated that the construction of a boring tool suitable for simultaneously forming chamber 38, post 40 and fulcrum point 42 is well within the competence of a skilled artisan; consequently, the elements enumerated next above can be quickly and simply formed with one machining operation.

Figure 4:
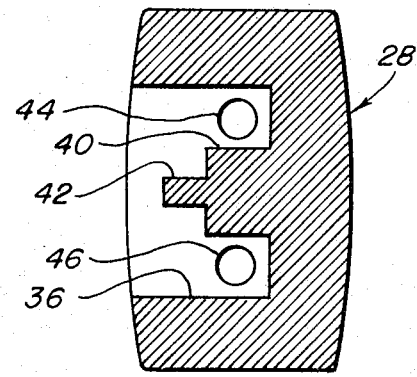
FIG. 4 is a cross-section view taken along line 4—4 of FIG. 3.

Extending chordally of cylindric chamber 36 and radially of bore 30 is a first passage 44 which includes (see FIG. 3) an outer region 44a that extends between chamber 36 and the exterior surface of the gate and an inner portion 44b that extends between chamber 36 and bore 30. A second passage 46 is formed parallel to and spaced from passage 44a; passage 46 extends from chamber 36 to the exterior surface of the gate. As seen most clearly in FIG. 4, passages 44 and 46 are preferably cylindric and therefore can be formed by drilling, the simplest of machining operations. In alignment with passage 44b, when gate 32 is in a closed or throat spanning position, is a recess 48 formed in shank 30, preferably by drilling in a direction radially of the shank.

Disposed in passage 44b is a first rod 50 that is adapted to slide within the passageway into and out of engagement with recess 48. Rod 50 is of sufficient length that it extends from recess 48 to the interior of cylindric chamber 36. Passage 44a has an internally threaded portion 52 near the outer end thereof for receiving therein a set screw 54. Between the inner end of set screw 54 and rod 50 is disposed a compression spring 56 for biasing the rod into engagement recess 48.

A second rod 58 is positioned in passage 46 for sliding movement therein and is of a length sufficient that the second rod extends from the interior of chamber 36 to a point beyond the exterior surface of the gate. Operatively connecting rods 50 and 58 within chamber 36 is a lever 60 which is centrally drilled to pivotally seat onto fulcrum point 42. At each end of lever 60 is a pin 62 which is received in a hole 64 that is drilled transversely of rod 50 and 58. The fit between pin 52 and hole 64 is sufficiently loose to afford relative pivotal and transverse movement between the lever and the respective rods. Lever arm 60 is retained on fulcrum point 42 by means of a cover disc 66 that is force fitted into chamber 36 to a position at which the cover disc contacts the outer end of fulcrum point 42. A suitable off-the-shelf element that has been successfully employed for cover disc 66 is a so-called "freeze plug" which when frozen contracts to a size sufficiently small for installation within chamber 36; when the disc is restored to ambient temperature, it expands so that it is firmly retained within the cylindric chamber.

The present invention operates as follows: when the gate is moved to a closed or throat spanning position as shown in FIG. 1, spring 56 biases rod 50 into recess 48 and the gate is locked in a closed position whereby inadvertent dislodgement of the load is avoided. When it is desired to open the gate, force is applied to the outer end of rod 58 which causes lever 60 to rotate in a counterclockwise direction as viewed in FIG. 1. The consequence of such movement by lever 60 is that rod 50 moves leftwardly as viewed in FIG. 1 out of engagement with recess 48. Rotation of the gate against the force of spring 33 is then possible so that the load can then be inserted into or removed from engagement with hook basket portion 16. It is noted that the fabrication of a gate lock according to the present invention is accomplished after initial casting by a series of boring operations. Thus, fabrication of the lock is rapid and inexpensive.

Figure 5:
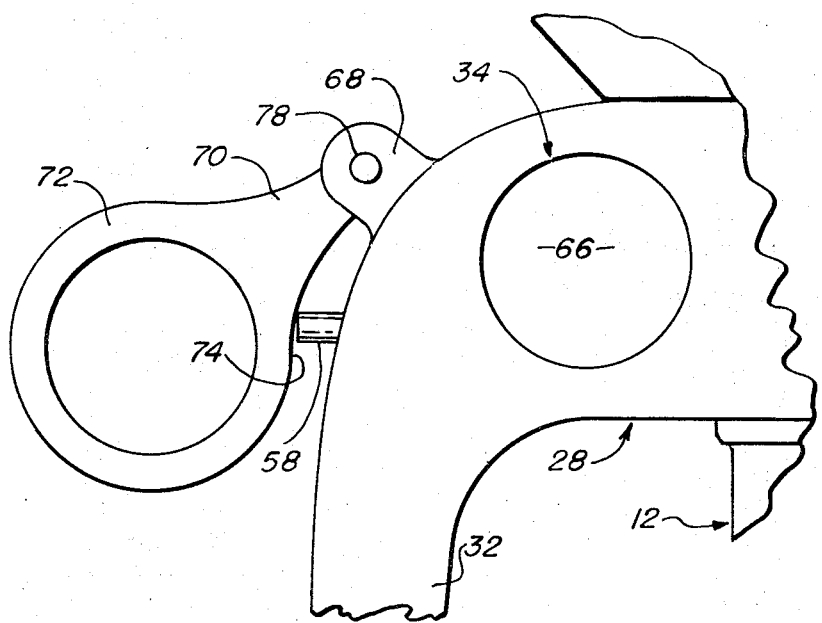
FIG. 5 is a fragmentary elevation view of a gate lock according to the present invention adapted for operation by a hot stick.

The direction of the force on rod 58 necessary to effect unlocking of the gate lock of the present invention is normal or perpendicular to the direction of force needed to open or close the gate. Accordingly, the present lock structure lends itself to modification for hot stick operation. In this respect as seen in FIG. 5, the outer surface of gate 28 is formed with a pair of parallelly spaced ears 68 which receive therebetween an arm 70 of a hot stick ring 72. A pin 78 extends through suitably positioned holes in ears 68 and arm 70 so that the hot stick ring pivots about the axis of pin 78. The hot stick ring has an abutment 74 which bears against the outer end of rod 58 so that engagement of hot stick ring 72 by a hot stick permits manipulation of the gate lock by movement in a direction axially of pin 58 and permits opening and closing of the gate by force applied in a direction normal to the above mentioned force. Consequently, the advantages of the invention are made available in hook gates adapted for operation in high voltage locations.

Thus, it will be seen that the present invention provides a hook gate lock that combines sureness of operation and ruggedness with simplicity and ease of construction. Moreover, the force necessary to disengage the lock is applied in a direction normal to the direction of force necessary to open or close the gate, as a consequence of which inadvertent opening of the gate is avoided. Although one embodiment of the invention has been shown and described, it will be obvious that other adaptations and modifications can be made without departing from the true spirit and scope of the invention.

What is claimed is:
1. In combination with a hoisting hook that includes a curved member having a medial load supporting portion, a tip at one extremity and a heel at the opposite extremity that confronts the tip across a throat opening for permitting engagement of a load into the load supporting portion, said hook including a cylindric shank extending from said curved member adjacent the heel, and a safety gate for spanning the throat and having a cylindric bore sized to receive the hook shank therein to permit the gate to be rotated between a closed position at which the gate spans the throat and an open position at which the gate is clear of the throat, an improved lock for releasably retaining the gate in a closed position comprising a portion of said gate adjacent said bore defining a chamber, a portion of said gate intermediate said chamber and said bore defining a first passage extending radially from said bore to said chamber, a portion of said gate defining a second passage extending from said chamber to the exterior surface of the gate, said second passage being on an axis that is parallel to and spaced from said first passage, there being a recess formed in said shank in alignment with the position of said first passage when said gate is in the closed position, a first rod disposed in said first passage and slidable into and out of said recess for respectively locking and unlocking said gate, said first rod extending into said chamber, means in said chamber for resiliently biasing said first rod toward said bore and into said recess, a second rod disposed in said second passage and having opposite ends respectively in said chamber and protruding exteriorly of said gate, means disposed in said chamber for operatively interconnecting said first and second rods so that inward force applied to said second rod moves said first rod against said biasing means out of engagement with said recess.

2. The invention of claim 1 wherein said operatively interconnecting means comprises means interior of said chamber for defining a fulcrum intermediate said passages, and a lever centrally supported on said fulcrum and having a first end pivotally attached to said first rod and a second end pivotally attached to said second rod so that inward movement of said first rod in response to force on the outer end thereof effects movement of said second rod out of said shank recess.

3. The invention of claim 2 wherein said chamber is defined by a cylindric wall in said gate and wherein said fulcrum point is positioned concentrically of said cylindric wall.

4. The invention of claim 3 including a disc disposed in said chamber and positioned substantially in contact with said fulcrum point, said disc being force fitted in said chamber.

References Cited
UNITED STATES PATENTS

| | | | |
|---|---|---|---|
| 1,144,099 | 6/1915 | Black | 24—241PSL |
| 1,441,378 | 1/1923 | Selvidge | 24—241PSL |
| 2,728,967 | 1/1956 | Burnham | 24—241PSL |
| 2,791,817 | 5/1957 | Burnham | 24—241PSL |
| 3,430,307 | 3/1969 | Burnham | 24—241PSL |

DONALD A. GRIFFIN, Primary Examiner